(No Model.) 2 Sheets—Sheet 1.
G. J. SCOTT.
MOTOR GENERATOR OR TRANSFORMER.
No. 454,883. Patented June 30, 1891.
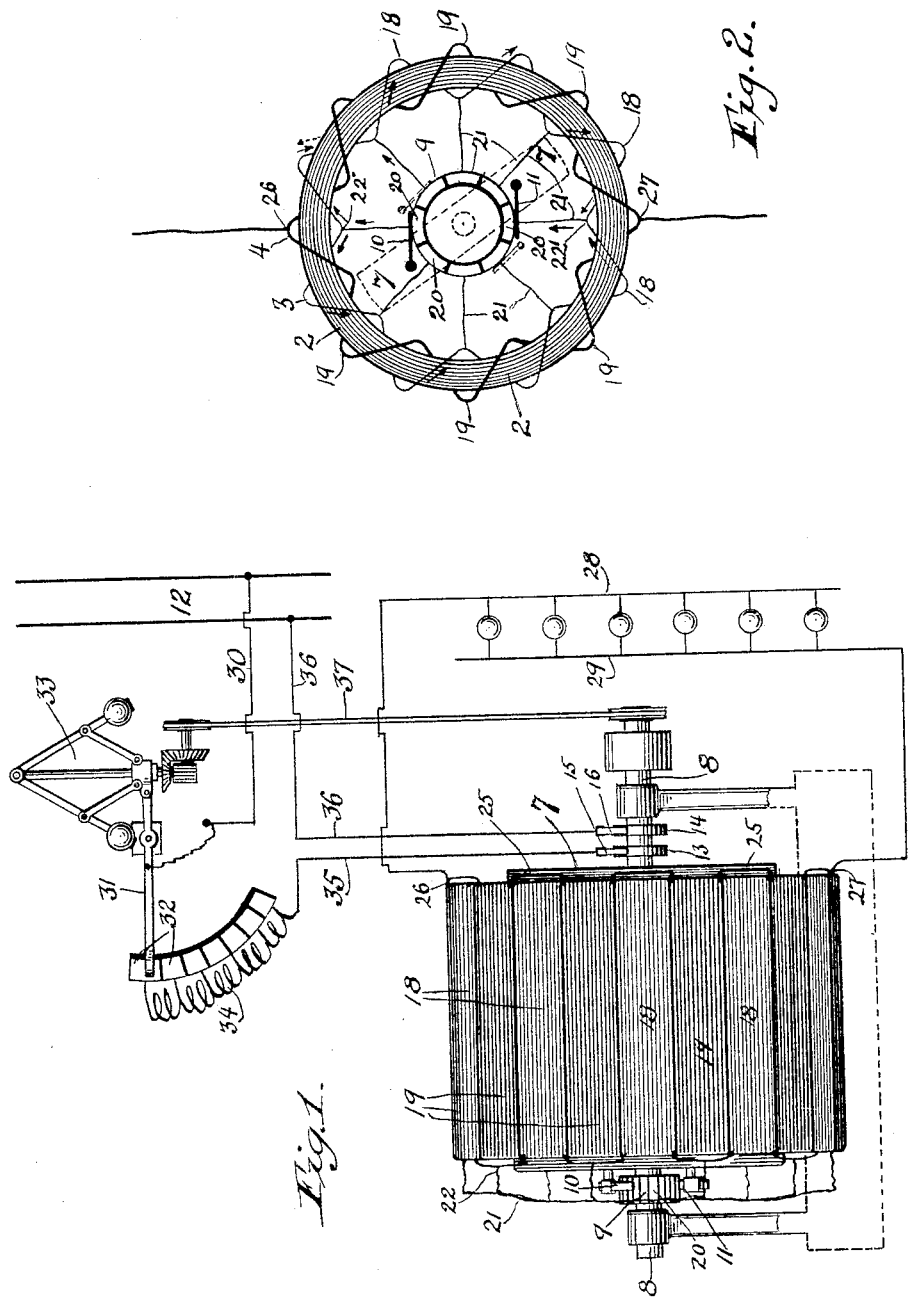
Witnesses-
C. E. Van Dorn.
C. Hawley.
Inventor.
Gordon J. Scott.
By Paul _____ Attys.

(No Model.) 2 Sheets—Sheet 2.
G. J. SCOTT.
MOTOR GENERATOR OR TRANSFORMER.
No. 454,883. Patented June 30, 1891.
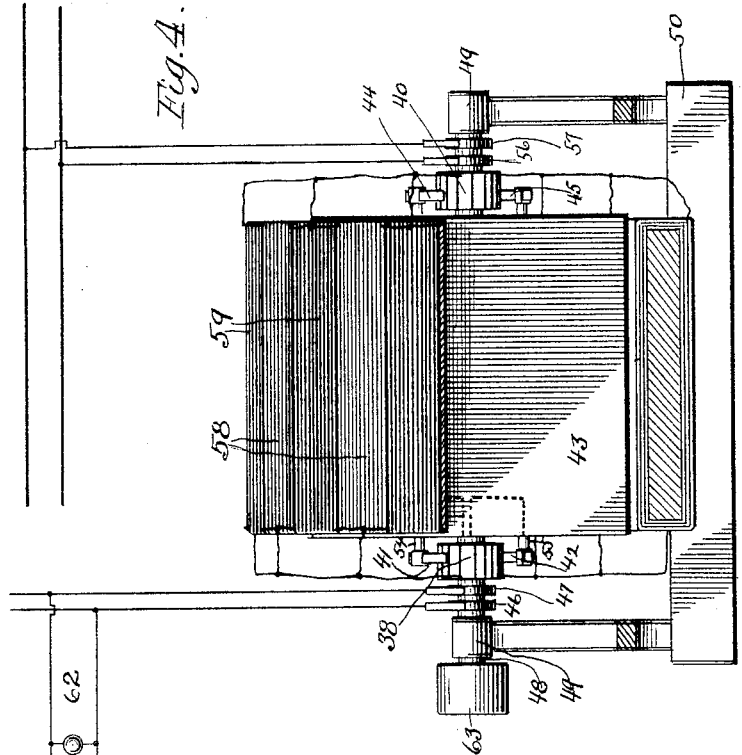
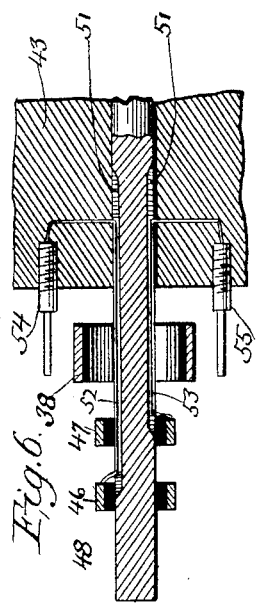
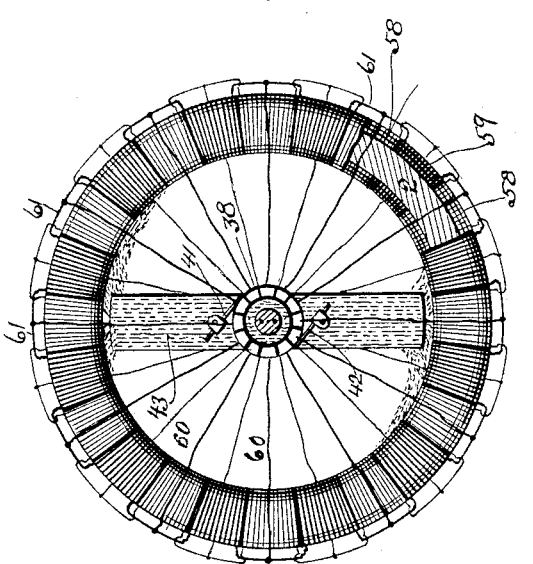
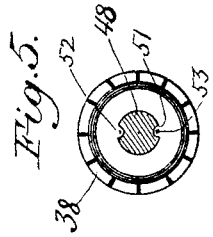
Witnesses.
C. E. Van Doren
C. G. Hawley
Inventor
Gordon J. Scott
By Paul Synnestvedt Attys

UNITED STATES PATENT OFFICE.

GORDON J. SCOTT, OF MINNEAPOLIS, MINNESOTA, ASSIGNOR OF ONE-HALF TO CALVIN G. GOODRICH, OF SAME PLACE.

MOTOR GENERATOR OR TRANSFORMER.

SPECIFICATION forming part of Letters Patent No. 454,883, dated June 30, 1891.

Application filed January 14, 1891. Serial No. 377,756. (No model.)

*To all whom it may concern:*

Be it known that I, GORDON J. SCOTT, of Minneapolis, in the county of Hennepin and State of Minnesota, have invented certain Improvements in Electric-Motor Generators or Transformers, of which the following is a specification.

My invention relates to an electric generator adapted to be driven by a current passed through a portion of its coils, or adapted to serve as a motor proper, or a primary and a secondary circuit being given to serve as transformer or converter.

The object of the invention is to provide means whereby either an alternating or a direct current may be employed for driving machinery, and at the same time supply lamps or other electric devices with currents, to convert an initial direct current into a secondary of either an alternating or direct current character, or to take off and supply from a given primary circuit a secondary circuit of another strength and electro-motive force, as indicated in ampères and volts.

The invention consists in an annular iron field-magnet ring having a suitable supporting-base in combination with primary and secondary windings on said ring, regularly disposed thereon, an armature adapted to rotate within said ring and consisting in a bar or block of iron, forming a diametrical path for the lines of force between opposite points in the field-magnet ring, and brushes or other contact devices provided on said armature and adapted to rotate therewith and to press upon the surface of a suitable collector having its segments connected with the windings of said ring.

The invention consists, further, in the use of a second collector or collectors in connection with the above machine and similar to the first collector and connected with the secondary windings of the field-magnet, whereby said machine is constituted a direct current converter or transformer, and in addition the invention consists in the constructions and combinations hereinafter described, and particularly pointed out in the claim.

My invention will be more readily understood by reference to the accompanying drawings, in which—

Figure 1 is a view of the simplest form of motor-generator, an automatic resistance device being shown in connection with the primary circuit thereof. Fig. 2 is a diagrammatic representation of the windings and collector connections of the same. Fig. 3 is an end view of a direct current motor generator and transformer, its supporting-base being removed and the field-magnet connections indicated. Fig. 4 is a side view of the same, partly in section and showing the armature, shaft, and supports. Figs. 5 and 6 are details.

As shown most plainly in the diagram, Fig. 2, the annular ring 2, made up of a solid piece of soft iron or of transverse laminations, is provided with a primary winding 3 and a secondary winding 4, each partially formed of a continuous wire passing entirely around the ring and forming a closed circuit. The connections between these windings and the exterior primary and secondary circuits form the differences between the machine shown in Figs. 1 and 2 and that illustrated in Figs. 3 and 4. These differences consist in the arrangement of collectors in connection with the several coils on the field-magnet. It is obvious that more than one set of secondary windings may be employed on the field-magnet ring in inductive condition with one set of primary coils; but in general I use only one set of such coils, and in the drawings I have shown but one. The primary and secondary coils may be wound about the ring in parallel strands or in layers one over the other, or, as shown in Figs. 1, 3, and 4, in separate bobbins, a secondary coil being interposed in each instance between primary coils. The latter way of winding the field-magnet is preferred as convenient and efficient. The connections with the coils are so made that current enters and leaves the two halves of the field-windings, whether primary or secondary, in multiple circuit. Within the field-magnet ring I provide the flat soft-iron armature 7, secured upon a shaft 8 and adapted to serve as a path for the lines of force passing between diametrically-opposite points in the ring and to revolve as the plane of greatest magnetic intensity passing through the axis of the ring is rotated by the shifting of current in the primary windings. A stationary collector 9 is provided in connection with the primary winding on the field-magnet ring, its segments being connected in multiple therewith. Brushes 10 and 11 are provided in suitable brush-holders, carried by the armature 7, and connected with the two sides of the working-circuit 12 by insulated strands passing through the armature of its shaft to insulated contact-rings 13 and 14, provided on the said shaft and making contact with stationary brushes 15 and 16, connected directly with said working primary circuit. The connections of the primary-circuit collector of the armature-shaft 8 with the primary coils are shown clearly in Figs. 1 and 2, where in the latter figure each turn of the wire 3 represents one of the bobbins 18 on the field-magnet ring, while each turn of the wire 4 represents a secondary coil 19 thereon. The secondary coils are distinguished by heavier lines, indicating wire of greater diameter than that of which the primary coils are composed. From each segment 20 of the primary collector 9 a branch 21 extends to a point 22 on the strand, coupling two primary coils 18. Suppose the brushes 10 and 11 to be connected with the terminal of a suitable electric generator provided at a distance and that current enters over the brush 10, passing out through the brush 11 on the opposite side of the collector. It will be seen that current will pass from the segments beneath the brush 10 to the point 22, where the wire 21 is attached between the two coils of the wire 3. At this point the current will divide, equal currents flowing through each half of the primary field-magnet windings and uniting again at the lower point 22' and passing by way of the short conductor to the collector-segment standing in contact with the brush 11. The position of the armature at this instant is indicated by dotted lines. As current is thus completed through the coils in advance of the armature, the line of greatest magnetic intensity in the field of force shifts ahead of the armature, whereupon the iron-bar armature endeavoring to assume the most direct path in the lines of force will revolve upon its axis in the direction shown by the arrow. As the armature revolves the brushes 10 and 11 are carried forward onto the next segments of the collector to again advance the line or plane of greatest magnetic intensity. By setting the brushes more or less ahead with respect to the collector, or twisting the collectors with respect to the field-windings, the magnetic lead in the field may be changed and the speed of the armature controlled or its revolution stopped or reversed at will. Thus far an electric motor has been developed the action of which is easily controlled, and which, moreover, owing to the fact that no windings are used upon the armature, may be employed with equal efficiency upon any electric circuit, whether supplied with a constant current, constant potential, or alternating current. By the addition of the secondary windings this motor is made into a generator or transformer.

The arrangement of the primary coils and their connections is precisely alike in both forms of the machines shown; but the connections of the secondary coils are different. In Figs. 1 and 2 the secondary coils 19 are connected together in series around the ring by loops 25, extending between adjacent ends of the coils. Then this secondary winding is tapped at two points 26 and 27 exactly opposite each other in the secondary winding. Connections extend from these points to the sides 28 and 29 of the secondary circuit, including lamps or other transmitting devices. Assume that current, either direct or alternating, enters the machine shown in Fig. 1 from the mains 12. From the branch 30 current passes to the swinging arm 31, making contact with the strip of resistance-plates 32 and adapted to be operated by a suitable governor, as 33, operated by the revolution of the armature-shaft 8. From the arm 31 current passes through all of the resistance-coils 34 to the conductor 35, connecting with the brush 15, making contact with the insulated ring 13. From thence the current passes to the brush 10, bearing upon the surface of the collector 9. Thence the current divides and passes through the primary windings of the field, uniting and passing out over the brush 11, contact-ring, and brush 16 to the limb 36 of the circuit, extending to the other side of the main 12. As the circuit is thus completed the armature would immediately start up and revolve at a considerable speed, whereupon the governor, connected with the armature-shaft by the belt 37, would operate to move the arm 31 and gradually cut out the resistance 34. The armature in revolving carries the brushes forward, as described, and it will be seen that as the edge of the armature approaches a coil current will be established in one direction therein, while at the next phase of the revolution the direction of current will be reversed and established opposite to that of the first. Hence at each revolution of the armature two reversals take place in each coil. The secondary windings being in close proximity to the primary windings, a current of an electro-motive force, dependent on the number of turns in the secondary windings, will be induced in the secondary, which will flow out over the closed secondary circuit containing the lamps, the direction of current therein being reversed each time that current is reversed in the primary. Thus it will be seen that an alternating current will be generated in the secondary circuit, whether an alternating or a direct current is used in the primary. In the latter case, however, the alternations would be less rapid than with an alternating current in use in the primary coils. Thus the machine shown in Figs. 1 and 2 constitutes not only a motor or a motor-generator, but a transformer delivering an alternating circuit in the secondary without regard to the kind of current employed in the primary winding.

I provide a constant current or constant potential direct current transformer by adding to the machine above described the secondary collector 38, (shown in Figs. 3 and 4,) having its segments connected in multiple with the secondary windings of the field-magnet, just as the primary sections and collector are connected. This collector 38 is stationary, like the collector 40, corresponding to the collector 9 in Fig. 1, and is adapted to make contact with the brushes 41 and 42, carried on the end of the armature 43 and occupying the same position with respect to the segments of the collector 38, as do the brushes 44 and 45 to the segments of the collector 40. Current is communicated to the brushes by an arrangement of insulated conductors and contact-rings. (Shown in Figs. 5 and 6.) The contact-rings 46 and 47 are insulated and placed on the shaft 48, supported in suitable bearings 49, provided on the base 50 of the machine. Grooves or channels 51 are cut in the shaft 48 and through these conductors 52 and 53 pass back into the end of the armature 43, and thence connected with the spindles 54 and 55, respectively, adapted to support the brush-holders of the brushes 41 and 42. The connections between the contact-rings 56 and 57 of the primary are exactly the same with the supports for the brushes 44 and 45 as those between the rings 46 and 47 and the spindles 54 and 55 of the secondary side of the machine. Suppose the circuit to have been closed through the primary windings 58 of the machine, thereby setting up the rotation of the armature and generating inductive currents in the secondary winding 59, the currents thus induced pass to the segments of the collector 38 through the connections 60, extending between the collector-segments and opposite points on the loops 61, between the several secondary windings or bobbins. It will be seen that current will at all times enter the segments of the collector under the brush 41 from the same direction, while current will flow out of the machine over those segments, making contact successively with the lower brush 42, or vice versa, if the direction of the primary current be opposite that supposed. Hence the current in the branches of the secondary circuit 62, connected with the brushes 41 and 42, will be either a continuous current or constant potential, according to the current in the primary circuit. By means of a belt passing over the pulley 63 on the armature-shaft 48 mechanical power may be developed by the machine, as with ordinary motors. Consequently either of the machines described may be used, first, as an ordinary electric motor to drive machinery; second, as a dynamo generating in itself a current adapted to run motors, lamps, or other translating devices provided in the secondary circuit, or to serve simply as a transformer for either direct or alternating currents, according to the type of machine used. A governor adapted to operate a resistance device in the primary circuit of the Fig. 4 machine may be provided, if desired. The arrangement is such that the resistance in the primary circuit will be cut in or out as the motor speeds up, as required in the use of the desired kind of current.

Having thus described my invention, I claim as new and desire to secure by Letters Patent—

The combination, in a device of the class described, of the annular iron ring 2 with the primary and secondary windings thereon, a stationary collector for said primary windings, the flat iron armature arranged on a suitable shaft, the contact-brushes carried thereby and making contact with opposite segments of said collector, a primary working-circuit connected therewith, a secondary circuit including translating devices and having its terminals connected with said secondary windings and diametrically-opposite points on said ring, resistance interposed in said primary circuit, and means for automatically cutting the same in or out of circuit as the speed of the said armature varies, substantially as described, and for the purpose set forth.

In testimony whereof I have hereunto set my hand this 14th day of January, 1891.

GORDON J. SCOTT.

In presence of—
 ALFRED T. GAGE,
 C. E. HUNT.